United States Patent
Liao

(10) Patent No.: US 9,357,042 B2
(45) Date of Patent: May 31, 2016

(54) HANDHELD ELECTRONIC DEVICE

(75) Inventor: Chi-Yi Liao, Taoyuan County (TW)

(73) Assignee: HTC CORPORATION, Taoyuan (TW)

( * ) Notice: Subject to any disclaimer, the term of this patent is extended or adjusted under 35 U.S.C. 154(b) by 205 days.

(21) Appl. No.: 13/604,625

(22) Filed: Sep. 6, 2012

(65) Prior Publication Data
US 2014/0063356 A1    Mar. 6, 2014

(51) Int. Cl.
*G02F 1/1333* (2006.01)
*H04M 1/02* (2006.01)
*G02F 1/133* (2006.01)

(52) U.S. Cl.
CPC ......... *H04M 1/0264* (2013.01); *G02F 1/13338* (2013.01); *G02F 2001/13312* (2013.01)

(58) Field of Classification Search
CPC .................................... G02F 1/13338
USPC ................................. 349/12, 58–60
See application file for complete search history.

(56) References Cited

U.S. PATENT DOCUMENTS

| 2004/0207787 A1* | 10/2004 | Nakamura et al. ............ 349/119 |
| 2009/0146970 A1* | 6/2009 | Lowles et al. ................. 345/174 |
| 2010/0117943 A1* | 5/2010 | Pak et al. ........................ 345/89 |
| 2010/0213041 A1* | 8/2010 | Chen et al. ..................... 200/314 |
| 2010/0309369 A1* | 12/2010 | Jarvis et al. .................... 348/371 |
| 2011/0133998 A1* | 6/2011 | Hobson et al. ................. 343/702 |
| 2013/0063676 A1* | 3/2013 | Tsuchihashi et al. ........... 349/54 |
| 2013/0176512 A1* | 7/2013 | Posner et al. ................... 349/33 |

FOREIGN PATENT DOCUMENTS

| CN | 1638434 | 7/2005 |
| CN | 101738755 | 6/2010 |
| CN | 102385181 | 3/2012 |
| CN | 102466960 | 5/2012 |
| JP | 2010015015 | 1/2010 |
| TW | 262541 | 11/1995 |

OTHER PUBLICATIONS

"Office Action of Taiwan Counterpart Application", issued on Sep. 9, 2014, p. 1-6, in which the listed references were cited.
"Office Action of China Counterpart Application", issued on Aug. 21, 2015, p. 1-7, in which the listed references were cited.

* cited by examiner

*Primary Examiner* — Richard Kim
*Assistant Examiner* — Kendrick Hsu
(74) *Attorney, Agent, or Firm* — Jianq Chyun IP Office

(57) ABSTRACT

A handheld electronic device has a display side and a back side opposite to the display side. The handheld electronic device includes a case, a host system, an optical device, an opening region, and a liquid crystal light valve. The host system and the optical device are disposed in the case, and the optical device is electrically coupled to the host system. The opening region is located on the display side or the back side to expose the optical device. The liquid crystal light valve is disposed in the opening region and is electrically coupled to the host system to control the luminous flux passing through the opening region.

11 Claims, 4 Drawing Sheets

HANDHELD ELECTRONIC DEVICE

BACKGROUND OF THE INVENTION

1. Field of the Invention

The invention relates to an electronic device. More particularly, the invention relates to a handheld electronic device.

2. Description of Related Art

A handheld electronic device, such as a mobile phone, a personal digital assistant (PDA), and so on, is characterized by convenience and portability and thus has gradually become indispensable to our daily lives. The handheld electronic device is not only able to perform a conventional communication function but also capable of exercising additional functions. For instance, a photo-taking function of an optical device may be integrated into the handheld electrode device.

At present, the optical device (e.g., a camera device) of the handheld electronic device is designed to be placed on a display surface of the handheld electronic device or on a back cover of the body of the handheld electronic device. Nonetheless, no matter where the camera device is located, the camera device is directly placed on the external surface of the handheld electronic device and is exposed to the surroundings. The exposed optical device may disfigure the handheld electronic device and thus may not satisfy the increasing requirements for aesthetic exterior design of the handheld electronic device. Hence, designers may need to adjust the structural design of the handheld electronic device, so that the exposed optical device does not significantly impair the look of the handheld electronic device. That is, the existing optical devices configured on the handheld electronic devices pose a limitation to the exterior design flexibility of the handheld electronic devices, and the manufacturing costs of the handheld electronic devices are correspondingly increased.

SUMMARY OF THE INVENTION

The invention is directed to a handheld electronic device in which an optical device may be precluded from impairing the overall look of the handheld electronic device, thus enhancing the exterior design flexibility of the handheld electronic device and lowering down manufacturing costs of the handheld electronic device.

In an embodiment of the invention, a handheld electronic device that has a display side and a back side opposite to the display side is provided. The handheld electronic device includes a case, a host system, an optical device, an opening region, and a liquid crystal light valve. The host system and the optical device are disposed in the case, and the optical device is electrically coupled to the host system. The opening region is located on the display side or the back side to expose the optical device. The liquid crystal light valve is disposed in the opening region and is electrically coupled to the host system to control a luminous flux passing through the opening region.

According to an embodiment of the invention, the liquid crystal light valve includes a liquid crystal layer and a control electrode. The control electrode is electrically coupled to the host system to apply an electric field to the liquid crystal layer.

According to an embodiment of the invention, the liquid crystal light valve further includes two polarizers that are respectively located at the two respective sides of the liquid crystal layer, and polarization directions of the polarizers are substantially orthogonal.

According to an embodiment of the invention, the optical device has an acting surface that faces the display side, and the handheld electronic device further includes a transparent cover plate and a shielding layer. The transparent cover plate is located on the display side and connected to the case. The shielding layer is disposed between the transparent cover plate and the optical device. Here, the shielding layer has a first opening to form the opening region. The optical device is a camera device or a light emitting device, for instance.

According to an embodiment of the invention, the first opening of the shielding layer includes at least one key pattern that may be employed together with the light emitting device and may then serve as an input interface of the handheld electronic device.

According to an embodiment of the invention, the handheld electronic device further includes a light guiding device disposed between the key pattern and the light emitting device.

According to an embodiment of the invention, the handheld electronic device further includes a light detection device that is located on the display side and electrically coupled to the host system to detect ambient light. When the brightness of the ambient light is higher than a threshold value, the host system turns off the light emitting device; when the brightness of the ambient light is lower than the threshold value, the host system turns on the light emitting device.

According to an embodiment of the invention, the handheld electronic device further includes a touch sensing device that is disposed between the transparent cover plate and the optical device.

According to an embodiment of the invention, the touch sensing device has a circuit, and the shielding layer covers the circuit.

According to an embodiment of the invention, the optical device has an acting surface that faces the back side, the opening region includes an opening that is located on the case, and the acting surface and the opening are horizontally overlapped. The optical device is a camera device or a light emitting device, for instance.

According to an embodiment of the invention, the liquid crystal light valve includes a passive liquid crystal layer and a control electrode. The passive liquid crystal layer is connected to the case and sealing the opening region. The control electrode is electrically coupled to the host system to apply an electric field to the passive liquid crystal layer, so as to control the passive liquid crystal layer to cover or expose the acting surface of the optical device.

As provided above, in the handheld electronic device described in an embodiment of the invention, the liquid crystal light valve is configured in the opening region corresponding to the optical device, so as to control the luminous flux passing through the opening region. The optical device may also be adjusted to be less exposed to the external surroundings, and thereby the optical device will not significantly impair the overall look of the handheld electronic device.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
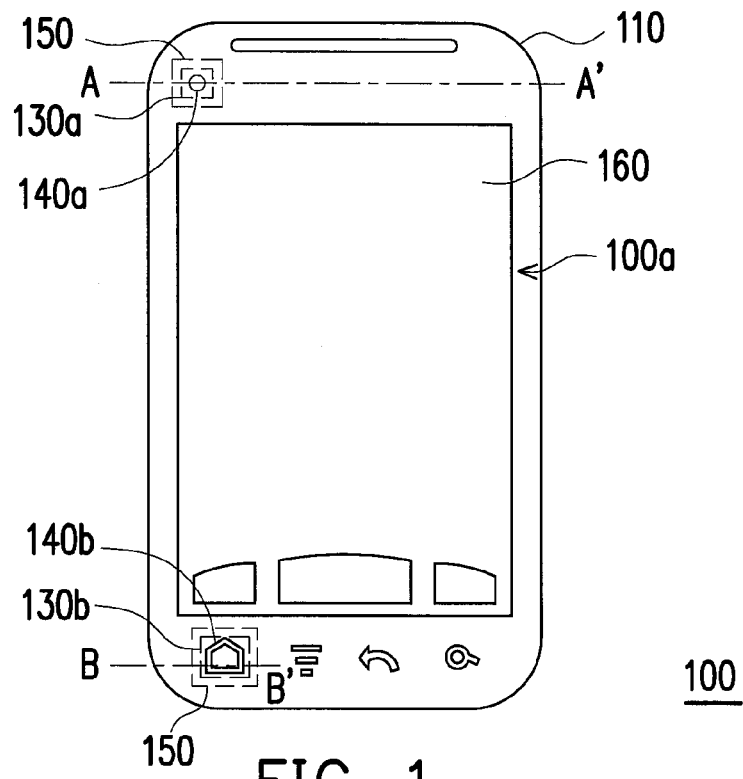
FIG. 1 is a top view of a handheld electronic device according to an embodiment of the invention.
Figure 2:
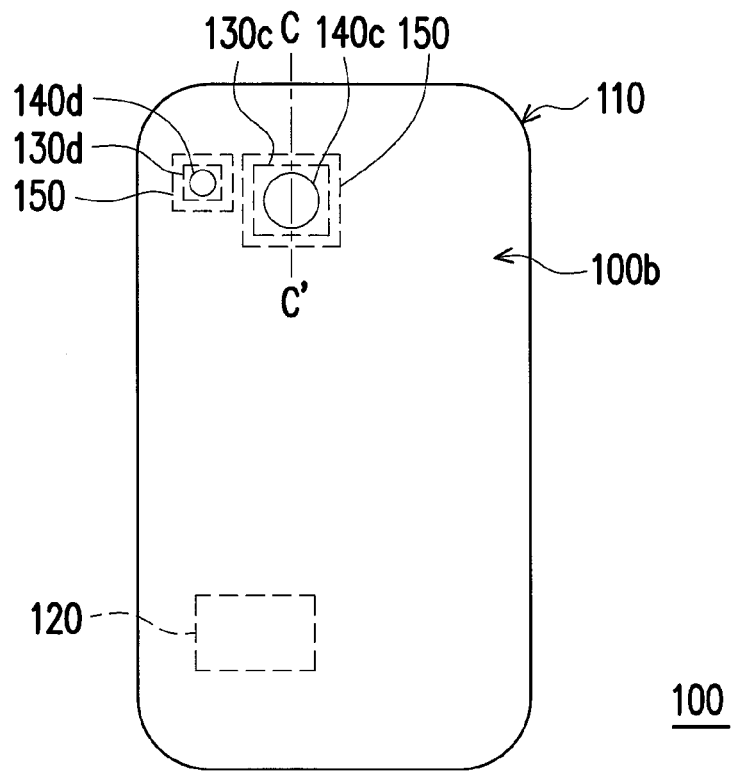
FIG. 2 is a bottom view of a handheld electronic device according to an embodiment of the invention.

FIG. 1 is a top view of a handheld electronic device according to an embodiment of the invention. FIG. 2 is a bottom view of a handheld electronic device according to an embodiment of the invention. With reference to FIG. 1 and FIG. 2, the handheld electronic device 100 has a display side 100a and a back side 100b opposite to the display side 100a. Here, the handheld electronic device 100 includes a case 110, a host system 120, camera devices 130a and 130c, a light emitting device 130b, a flashlight 130d, opening regions 140a, 140b, 140c, and 140d, and a plurality of liquid crystal light valves 150. The host system 120, the camera devices 130a and 130c, the light emitting device 130b, and the flashlight 130d are all configured in the case 110. The camera devices 130a and 130c, the light emitting device 130b, and the flashlight 130d are electrically coupled to the host system 120. The opening regions 140a and 140b are located on the display side 100a of the handheld electronic device 100, and the opening regions 140c and 140d are located on the back side 100b of the handheld electronic device 100.

Each of the opening regions 140a, 140b, 140c, and 140d exposes corresponding optical devices. For instance, in FIG. 1, the opening region 140a exposes the camera device 130a configured in the case 110, and the opening region 140b exposes the camera device 130b configured in the case 110. In FIG. 2, the opening region 140c exposes the other camera device 130c configured in the case 110, and the opening region 140d exposes the flashlight 130d configured in the case 110. The liquid crystal light valves 150 are disposed in the corresponding opening regions 140a, 140b, 140c, and 140d and are electrically coupled to the host system 120 to control a luminous flux passing through the opening regions 140a, 140b, 140c, and 140d.

The locations of the opening regions (on the display side 100a or the back side 100b of the handheld electronic device 100) and the corresponding optical devices exposed by different opening regions may be classified into four conditions. When the opening region (e.g., the opening region 140a or the opening region 140b shown in FIG. 1) is located on the display side 100a of the handheld electronic device 100, the optical device may refer to the camera device 130a or the light emitting device 130b. For instance, the camera device 130a may be a front lens of the handheld electronic device 100, and the light emitting device 130b may be a light source of touch keys of the handheld electronic device 100.

When the opening region (e.g., the opening region 140c or the opening region 140d shown in FIG. 2) is located on the back side 100b of the handheld electronic device 100, the optical device may refer to the camera device 130c or the flashlight 130d. For instance, the camera device 130c may be a back camera of the handheld electronic device 100, and the flashlight 130d may serve as a photoflash of the handheld electronic device 100. Said four conditions are described in the following four embodiments. Here, the four embodiments may be collectively implemented in the same handheld electronic device 100 or respectively implemented in different handheld electronic devices. It is exemplarily assumed that the four embodiments are collectively implemented in the same handheld electronic device 100, which should however not be construed as a limitation to the invention. The number of embodiments actually implemented in the handheld electronic device is determined based on the design requirements and the effects to be achieved.

Figure 3:
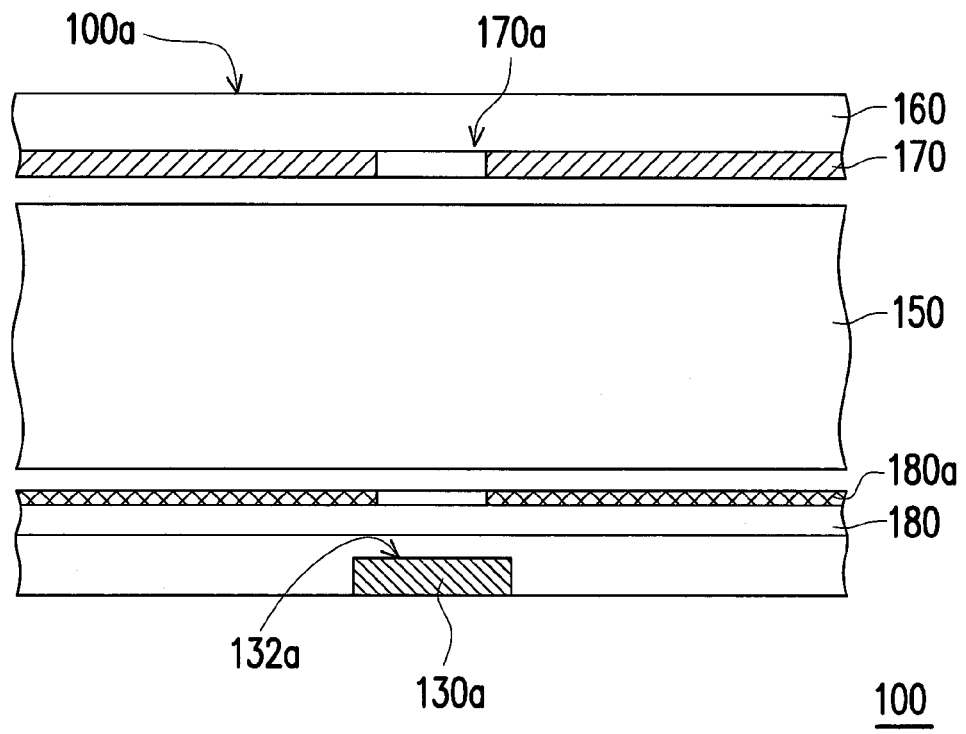
FIG. 3 is a cross-sectional diagram structurally illustrating the handheld electronic device depicted in FIG. 1 along a line A-A'.

First, the opening region is assumed to be located on the display side 100a of the handheld electronic device 100, and the optical device is assumed to be the camera device 130a. FIG. 3 is a cross-sectional diagram structurally illustrating the handheld electronic device 100 depicted in FIG. 1 along a line A-A'. Please refer to FIG. 1 and FIG. 3. In the present embodiment, the opening region is exemplarily located on the display side 100a of the handheld electronic device 100, and therefore an acting surface 132a of the camera device 130a faces the display side 100a of the handheld electronic device 100. The handheld electronic device 100 may further include a transparent cover plate 160 and a shielding layer 170. The transparent cover plate 160 is located on the display side 110a of the case 110 and connected to the case 110. The shielding layer 170 is disposed between the transparent cover plate 160 and the camera device 130a. Here, the shielding layer 170 has a first opening 170a to form the opening region 140a. The handheld electronic device 100 further includes a touch sensing device 180 that is disposed between the transparent cover plate 160 and the camera device 130. The touch sensing device 180 may have a circuit 180a that is covered by the shielding layer 170.

The liquid crystal light valve 150 is disposed below the first opening 170a and may control the luminous flux that passes through the first opening 170a. For instance, when the camera device 130a is in an off state, the host system 120 may control the liquid crystal light valve 150 to be non-transparent. At this time, the camera device 130a is covered by the liquid crystal light valve 150, and thus a user is not able to see the camera device 130a when the camera device 130a is in an off state. By contrast, when the camera device 130a is in an on state, the host system 120 may control the liquid crystal light valve 150 to be transparent. At this time, light may pass through the liquid crystal light valve 150, such that the camera device 130a is allowed to take pictures of surrounding objects.

Figure 4A:
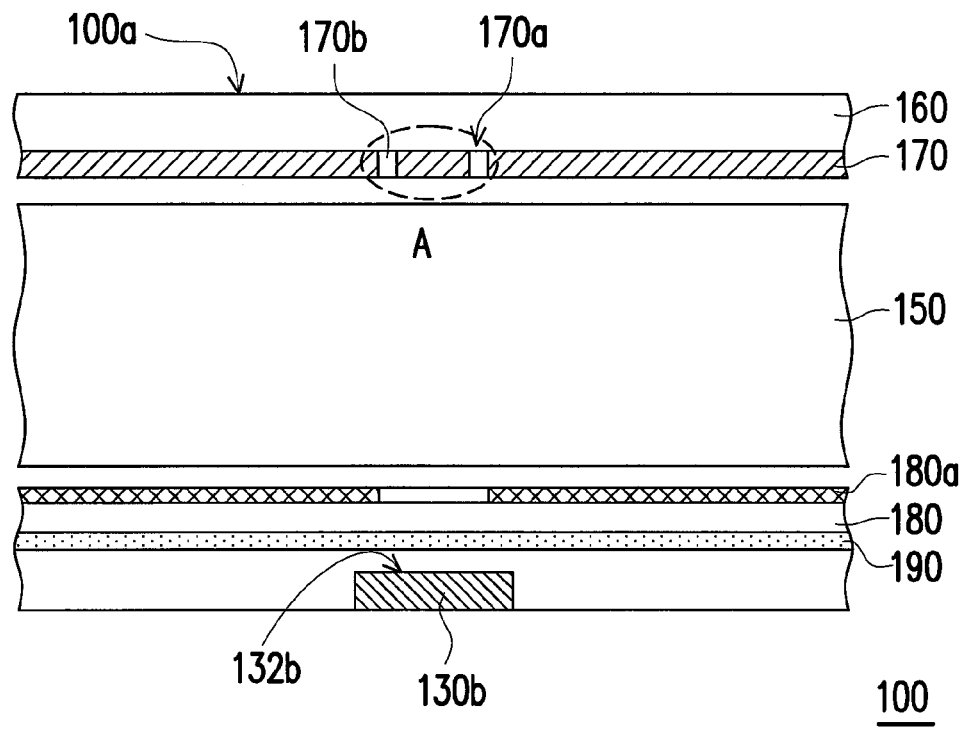
FIG. 4A is a cross-sectional diagram structurally illustrating the handheld electronic device depicted in FIG. 1 along a line B-B'.
Figure 4B:
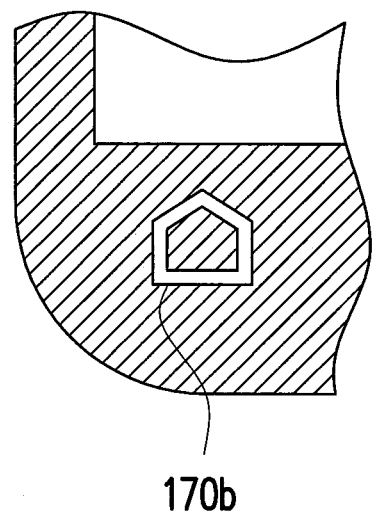
FIG. 4B is an enlarged top view showing a portion A depicted in FIG. 4A.

FIG. 4A is a cross-sectional diagram structurally illustrating the handheld electronic device depicted in FIG. 1 along a line B-B'. FIG. 4B is an enlarged top view showing a portion A depicted in FIG. 4A. Please refer to FIG. 1, FIG. 4A, and FIG. 4B. Some devices and structural configurations described in the second embodiment are the same as those described in the first embodiment, and therefore the same reference numbers are employed to represent the same or similar devices in the first and second embodiments. Here, the acting surface 132b of the light emitting device 130b faces the display side 100a of the handheld electronic device 100. According to the present embodiment of the invention, the optical device refers to the light emitting device 130b, e.g., a light emitting diode (LED) lamp. The first opening 170a of the shielding layer 170 described herein has a key pattern 170b. The second embodiment is similar to the first embodiment: when the light emitting device 130 is in an off state, the host system 120 may control the liquid crystal light valve 150 through applying a voltage or so, for instance, such that light is not allowed to pass through the liquid crystal light valve 150. Hence, a user is not able to see the light emitting device 130*b* located within the case 110. By contrast, when the light emitting device 130*b* is in an on state, the host system 120 may control the liquid crystal light valve 150 to allow light to pass through. If light is allowed to pass through the liquid crystal light valve 150, the light passes through the key pattern 170*b* of the shielding layer 170, and thus a user is able to see through the handheld electronic device 100 and observe the glowing key pattern 170*b*. In the present embodiment, the key pattern 170*b* is located in the light shielding layer 170, which should however not be construed as a limitation to the invention; in another embodiment that is not shown in the drawings, the key pattern 170*b* of the handheld electronic device 100 is located between the light emitting device 130*b* and the liquid crystal light valve 150.

To ensure the user to observe the key pattern 170*b* with the uniform brightness, the handheld electronic device 100 further includes a light guiding device 190, e.g., a light guiding film. The light guiding device 190 is disposed between the key pattern 170*b* and the light emitting device 130*b*. According to the present embodiment, the key pattern 170*b* disposed on the display side 100*a* may be utilized along with the touch sensing device 180 of the handheld electronic device 100, such that a user is allowed to perform a touch function.

The handheld electronic device 100 may further include a light detection device (not shown) that is located on the display side 110*a* and electrically coupled to the host system 120 to detect ambient light. When the brightness of the ambient light is higher than a threshold value, the host system 120 turns off the light emitting device 130*b*; when the brightness of the ambient light is lower than the threshold value, the host system 120 turns on the light emitting device 130*b*. Through the light detection device, the handheld electronic device 100 described in the present embodiment is able to detect the brightness of the ambient light and thereby turn on or turn off the light emitting device 130*b* via the host system 120. Therefore, the light emitting device 130*b* may be automatically turned on or turned off according to the location where the light emitting device 130*b* is used, which is rather convenient from a user's perspective.

Figure 5:
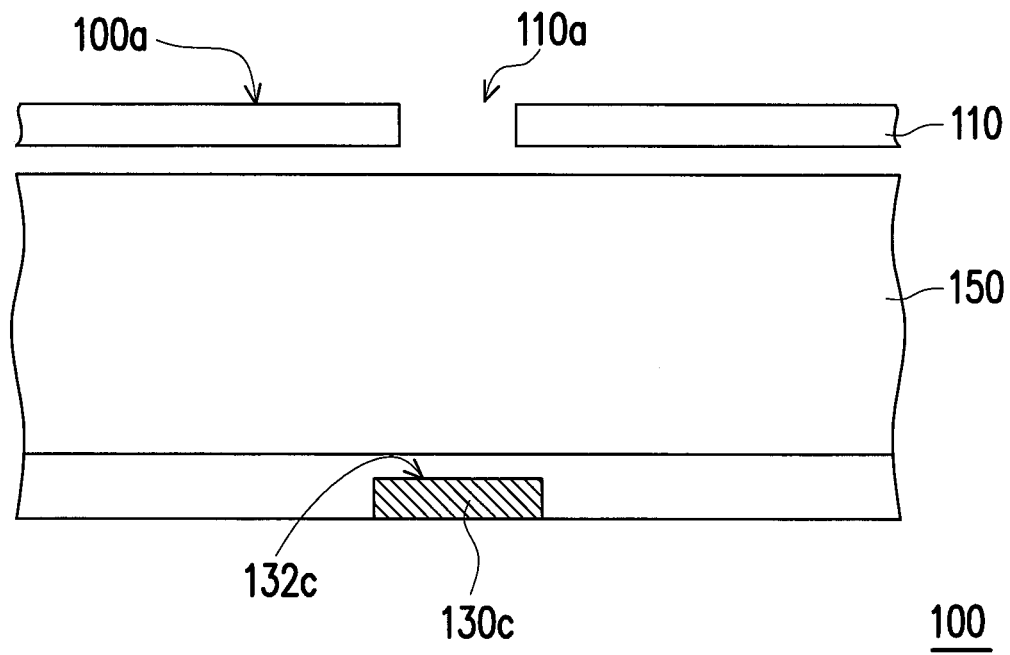
FIG. 5 is a cross-sectional diagram structurally illustrating the handheld electronic device depicted in FIG. 1 along a line C-C'.

FIG. 5 is a cross-sectional diagram structurally illustrating the handheld electronic device depicted in FIG. 2 along a line C-C'. Please refer to FIG. 2 and FIG. 5. When the opening region 140*c* is exemplarily located on the back side 100*b* of the handheld electronic device 100, the opening region 140*c* includes an opening 110*a* located on the case 110. As shown in FIG. 5, the liquid crystal light valve 150 is disposed between the camera device 130*c* and the case 110. The manner in which the liquid crystal light valve 150 controls the luminous flux passing through the opening region 140*c* is the same as the manner described in other previous embodiments, and therefore no further explanation is provided hereinafter. As shown in FIG. 2, when the opening region is located on the back side 100*b*, the optical device may refer to the camera device 130*c* or the flashlight 130*d*. In the event that the optical device is the flashlight 130*d*, the cross-sectional structure described herein is the same as that described in the third embodiment, and the manner in which the liquid crystal light valve 150 controls the luminous flux passing through the opening region 140*c* is also the same as the manner described in other previous embodiments. The difference between the present embodiment and the previous embodiments lies in the types of the optical device and thus will not be further elaborated.

In the present embodiment, the opening region is exemplarily located on the back side 100*b* of the handheld electronic device 100, and therefore an acting surface 132*c* of the camera device 130*c* faces the back side 100*b* of the handheld electronic device 100. Besides, given that the camera device 130*c* and the flashlight 130*d* are both located on the back side 100*b* of the same handheld electronic device 100, the flashlight 130*d* may emit light when the ambient light is overly dim, so as to support the photo-taking function of the camera device 130*c*.

Locations of each device in the handheld electronic device 100 and the function of the liquid crystal light valve 150 in the handheld electronic device 100 are described above, while the manner in which the liquid crystal light valve 150 controls the luminous flux passing through the corresponding opening regions 140*a*, 140*b*, 140*c*, and 140*d* will be explained hereinafter.

Figure 6:
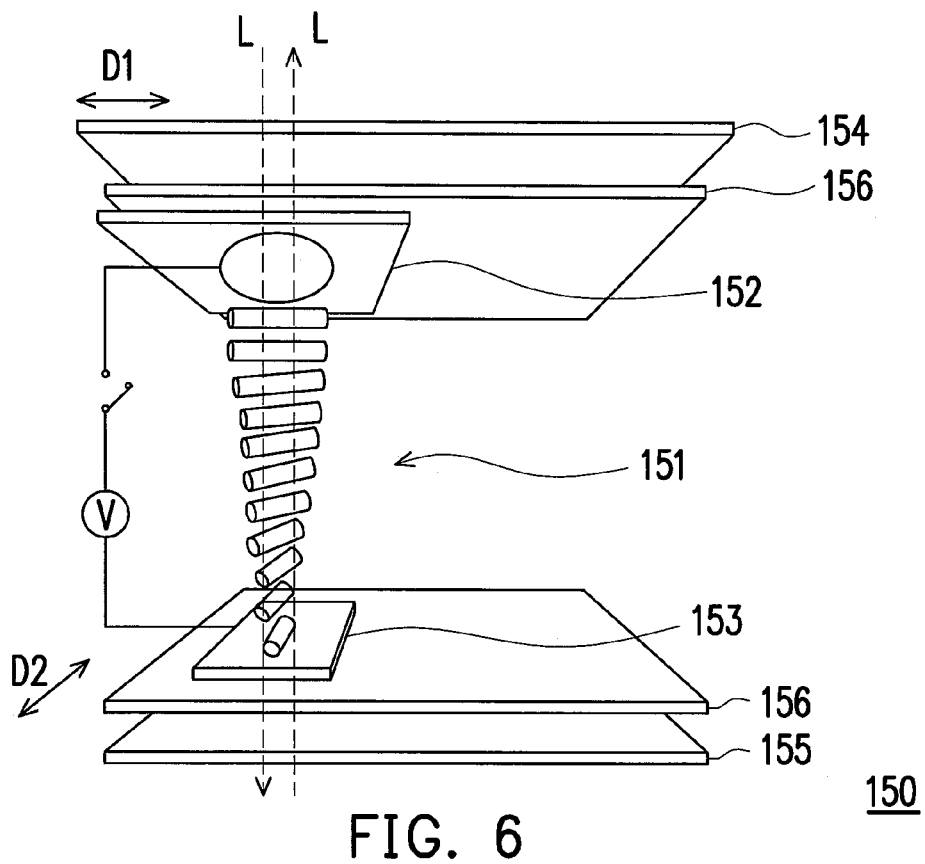
FIG. 6 is a three-dimensional diagram illustrating a liquid crystal light valve to which no voltage is applied.
Figure 7:
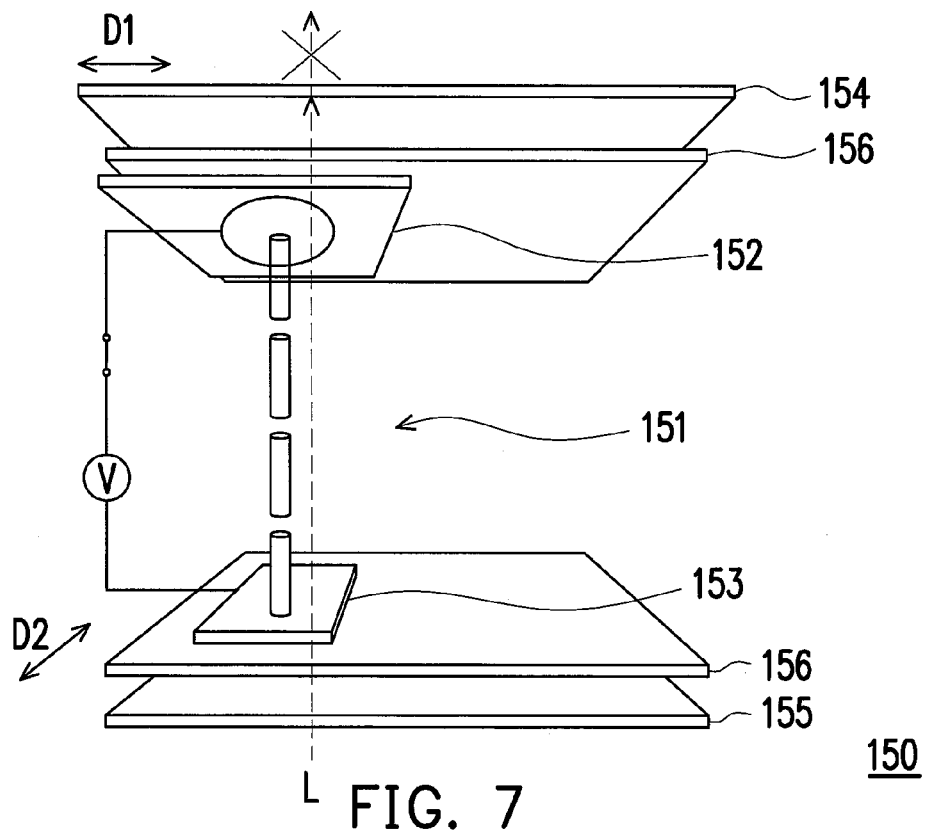
FIG. 7 is a three-dimensional diagram illustrating a liquid crystal light valve to which a voltage is applied.

FIG. 6 is a three-dimensional diagram illustrating a liquid crystal light valve to which no voltage is applied. FIG. 7 is a three-dimensional diagram illustrating a liquid crystal light valve to which an voltage is applied. Please refer to FIG. 6 and FIG. 7. In particular, the liquid crystal light valve 150 includes a liquid crystal layer 151, an upper control electrode 152, a lower control electrode 153, a first polarizer 154, a second polarizer 155, and two glass substrates 156. The upper control electrode 152 and the lower control electrode 153 are electrically coupled to the host system 120 to apply an electric field to the liquid crystal layer 151. The first and second polarizers 154 and 155 are respectively disposed at two respective sides of the liquid crystal layer 151. Here, a polarization direction D1 of the first polarizer 154 is substantially orthogonal to a polarization direction D2 of the second polarizer 155. Particularly, the liquid crystal light valve 150 controls the luminous flux that passes through the corresponding opening regions 140*a*, 140*b*, 140*c*, and 140*d* (not shown) by applying a voltage V, so as to change the electric field between the upper control electrode 152 and the lower control electrode 153.

With reference to FIG. 6, at this time, the voltage V is not yet applied to the upper control electrode 152 and the lower control electrode 153. Light L is allowed to pass through the first polarizer 154 only when the light has a single polarization direction which is the same as the polarization direction D1 of the first polarizer 154. After the light L having the single polarization direction passes through the liquid crystal layer 151, the polarization direction of the light L is rotated because of the optical rotation of liquid crystal molecules in the liquid crystal layer 151. To be more specific, when the light L passes through the first polarizer 154, the light L has the polarization direction D1; after the light L passes through the liquid crystal layer 151, the polarization direction D1 is rotated by 90 degrees and is then parallel to the polarization direction D2 of the second polarizer 155. Accordingly, light is allowed to pass through the liquid crystal light valve 150. Here, the light L may sequentially travel through the first polarizer 154, the liquid crystal layer 151, and the second polarizer 155, or the light L may travel in a counter direction, i.e., sequentially travel through the second polarizer 155, the liquid crystal layer 151, and the first polarizer 154.

In FIG. 7, the voltage V is applied to the upper control electrode 152 and the lower control electrode 153, so as to generate an electric field at the liquid crystal layer 151. At this time, the arrangement of the liquid crystal molecules in the liquid crystal layer 151 may be altered by the electric field. When the light L passes through the liquid crystal layer 151, the polarization direction of the light L is not changed and is still orthogonal to the polarization direction D2; accordingly, the light L is not allowed to pass through the second polarizer 155. At this time, light is not allowed to pass through the liquid crystal light valve 150.

In view of the above, the electric field may be generated at the liquid crystal light valve 150 through applying the voltage V, and thereby the arrangement of the liquid crystal molecules in the liquid crystal layer 151 may be controlled. Additionally, the luminous flux passing through the corresponding opening regions 140a, 140b, 140c, and 140d may also be monitored. If the liquid crystal light valve 150 is non-transparent and does not allow light to pass through, the camera devices 130a and 130c, the light emitting device 130b, and the flashlight 130d are covered, such that the overall look of the handheld electronic device 100 is not impaired by the optical devices 130a, 130b, 130c, and 130d, i.e., the handheld electronic device 100 may have an embellished look. Given that the voltage V applied to the liquid crystal light valve 150 no longer exists, the liquid crystal light valve 150 then becomes transparent and allows light to pass through. At this time, the camera devices 130a and 130c, the light emitting device 130b, and the flashlight 130d are exposed to the surroundings and may function as normal.

The operational principle of the liquid crystal light valve 150 controlling the luminous flux which passes through the opening regions 140a, 140b, 140c, and 140d is similar to the operational principle of a passive liquid crystal device in a normally white mode. That is, when the voltage V is applied to the liquid crystal layer 151, the liquid crystal light valve 150 is not transparent and does not allow light to pass through. On the contrary, if no voltage V is applied to the liquid crystal layer 151, the liquid crystal light valve 150 is transparent and allows light to pass through. As such, the liquid crystal layer 151 may be considered as a passive liquid crystal layer. Certainly, the way to drive the liquid crystal light valve 150 is not limited to that described above, and people having ordinary skill in the art may employ similar design to control the liquid crystal light valve 150. For instance, a passive liquid crystal device in a normally black mode may be utilized, or the luminous flux passing through the opening regions 140a, 140b, 140c, and 140d may be continuously adjusted by using an active liquid crystal device. Here, the transmittance of the liquid crystal light valve 150 may be 90%, 70%, 50%, 30%, 0, or the like.

To sum up, in the handheld electronic device described in an embodiment of the invention, the liquid crystal light valve disposed in the opening regions is applied to control the luminous flux passing through the opening regions. The luminous flux passing through the opening regions may be determined according to the optical device in use, and thereby the optical device may also be adjusted to be more exposed or less exposed to the external surroundings. Alternatively, the optical device not in use may be covered by the liquid crystal light valve. As such, the optical device does not impair the overall look of the handheld electronic device, which is conducive to the improvement of the exterior design flexibility of the handheld electronic device and the decrease in manufacturing costs of the handheld electronic device.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A handheld electronic device having a display side and a back side opposite to the display side, the handheld electronic device comprising:
    a case;
    a host system disposed in the case;
    an optical device disposed in the case and electrically coupled to the host system, wherein the optical device has an acting surface facing the display side;
    a display device disposed on the display side of the case and electrically coupled to the host system;
    an opening region located on the case to expose the optical device;
    a liquid crystal light valve disposed in the opening region and electrically coupled to the host system to control a luminous flux passing through the opening region, wherein the liquid crystal light valve covers the acting surface of the optical device; and
    a touch sensing device, disposed between the liquid crystal light valve and the optical device.

2. The handheld electronic device as recited in claim 1, wherein the liquid crystal light valve comprises:
    a liquid crystal layer; and
    a control electrode electrically coupled to the host system to apply an electric field to the liquid crystal layer.

3. The handheld electronic device as recited in claim 1, wherein the liquid crystal light valve further comprises two polarizers respectively located at the two respective sides of the liquid crystal layer, and polarization directions of the polarizers are substantially orthogonal.

4. The handheld electronic device as recited in claim 1, further comprising:
    a transparent cover plate located on the display side and connected to the case; and
    a shielding layer disposed between the transparent cover plate and the optical device, the shielding layer having a first opening to form the opening region.

5. The handheld electronic device as recited in claim 4, wherein the optical device comprises a camera device.

6. The handheld electronic device as recited in claim 4, wherein the optical device comprises a light emitting device.

7. The handheld electronic device as recited in claim 6, wherein the first opening of the shielding layer comprises at least one key pattern.

8. The handheld electronic device as recited in claim 7, further comprising a light guiding device disposed between the at least one key pattern and the light emitting device.

9. The handheld electronic device as recited in claim 7, further comprising a light detection device located on the display side and electrically coupled to the host system to detect ambient light, wherein when a brightness of the ambient light is higher than a threshold value, the host system automatically_turns off the light emitting device, and when the brightness of the ambient light is lower than the threshold value, the host system automatically turns on the light emitting device.

10. The handheld electronic device as recited in claim 4, wherein the touch sensing device has a circuit, and the shielding layer covers the circuit.

11. The handheld electronic device as recited in claim 1, wherein the liquid crystal light valve comprises:
    a passive liquid crystal layer connected to the case and sealing the opening region;
    a control electrode electrically coupled to the host system to apply an electric field to the passive liquid crystal layer, so as to control the passive liquid crystal layer to cover or expose the acting surface of the optical device.

* * * * *